(12) United States Patent
Pegg et al.

(10) Patent No.: US 9,305,206 B2
(45) Date of Patent: Apr. 5, 2016

(54) METHOD FOR ENHANCING DEPTH MAPS

(75) Inventors: Steven Robert Pegg, Bentley (AU);
Hugh Ross Sanderson, Bentley (AU);
Julien Charles Flack, Bentley (AU)

(73) Assignee: Dynamic Digital Depth Research Pty Ltd, West Perth, Western Australia (AU)

( * ) Notice: Subject to any disclaimer, the term of this patent is extended or adjusted under 35 U.S.C. 154(b) by 786 days.

(21) Appl. No.: 13/232,586

(22) Filed: Sep. 14, 2011

(65) Prior Publication Data

US 2012/0069007 A1 Mar. 22, 2012

(30) Foreign Application Priority Data

Sep. 14, 2010 (AU) ................................. 2010904133

(51) Int. Cl.
*G06K 9/00* (2006.01)
*G06T 7/00* (2006.01)
*H04N 13/00* (2006.01)

(52) U.S. Cl.
CPC .......... *G06K 9/00221* (2013.01); *G06T 7/0051* (2013.01); *H04N 13/0022* (2013.01); *G06T 2207/30201* (2013.01)

(58) Field of Classification Search
CPC .............. H04N 2013/0081; H04N 13/0285; H04N 13/026; H04N 13/0456; H04N 13/0018; H04N 13/0022; H04N 19/00139; H04N 13/004; H04N 13/0003; H04N 13/0282; H04N 13/0292; H04N 2213/003; H04N 2213/006; G02B 21/22; G02B 2027/0134; G06K 9/00221; G06K 9/3241; G06K 9/00248; G06K 9/00201; G06K 9/00362; G06T 2207/10012; G06T 2207/30201; G06T 7/0051; G06T 2207/10021; G06T 2207/30196; G06T 7/0042; G03B 35/00
USPC ........................................................ 345/419
See application file for complete search history.

(56) References Cited

U.S. PATENT DOCUMENTS

| 8,864,581 | B2 * | 10/2014 | Leyvand et al. ................. 463/30 |
| 2005/0180627 | A1 | 8/2005 | Yang et al. |
| 2007/0018977 | A1 | 1/2007 | Niem et al. |
| 2007/0098303 | A1 * | 5/2007 | Gallagher et al. ............ 382/305 |
| 2009/0196492 | A1 * | 8/2009 | Jung et al. ..................... 382/154 |
| 2009/0196510 | A1 * | 8/2009 | Gokturk et al. ............... 382/224 |
| 2010/0046837 | A1 | 2/2010 | Boughorbel |
| 2010/0080448 | A1 | 4/2010 | Tam et al. |
| 2011/0116690 | A1 * | 5/2011 | Ross et al. .................... 382/118 |
| 2011/0134109 | A1 * | 6/2011 | Izumi ............................ 345/419 |

OTHER PUBLICATIONS

May 29, 2014—(MX) Office Action—App MX/a/2013/002833, partial Eng Tran.
Oct. 5, 2011—(WO) International Search Report—App PCT/AU2011/001181.
Aug. 24, 2015—(RU) Office Action—App 2013114208/08(021021), Eng Tran.

* cited by examiner

*Primary Examiner* — Haixia Du
(74) *Attorney, Agent, or Firm* — Banner & Witcoff, Ltd.

(57) ABSTRACT

A system for enhancing a depth map associated with a 2D image wherein a face detector analyzes the 2D image to determine a position of a face in the 2D image, the system utilizes the position to derive a depth model; and the depth model is combined with the depth map to generate an enhanced depth map.

34 Claims, 5 Drawing Sheets

METHOD FOR ENHANCING DEPTH MAPS

CROSS REFERENCE TO RELATED APPLICATION

This application claims priority from Australian Patent Application No. 2010904133, filed on Sep. 14, 2010, the entire subject matter of which is incorporated herein by reference.

FIELD

The current invention relates to a method of enhancing or improving the quality of automatically calculated depth maps and in particular utilizing data derived from the 2D image to enhance the depth map.

BACKGROUND

Stereoscopic 3D display technologies are now becoming widely available to the consumer. However, the amount of 3D content available for consumption on such devices is still extremely limited due to the high cost of acquiring and processing stereoscopic content. Consumer electronics companies therefore have a strong demand for technology that can automatically convert existing 2D media into stereoscopic 3D in real-time or near real-time either within consumer playback devices such as TVs, Blu-Ray players or a set-top box.

There is a significant body of academic research focused on the extraction of 3D information from one or more 2D images in a video sequence. This process is useful in various fields of endeavor such as autonomous robotic navigation and is a central concept in the field of Computer Vision. However, the requirements for applications such as robotic navigation and computer vision are different to the requirements for applications in 3D entertainment devices. In Computer Vision the emphasis is on extracting physically accurate distance measurements whereas in applications for 3D entertainment the emphasis is on extracting depth information that provides a visually attractive 3D model that is consistent with 2D perspective cues in the image. The current invention falls into the latter category.

The fundamental problem facing 2D to 3D conversion techniques is that the problem is ill-posed meaning that given the information in the 2D image there are multiple different possible 3D configurations. In particular, automated 2D to 3D conversion algorithms operate on the basis of image characteristics such as color, position, shape, focus, shading and motion to name a few. They do not perceive "objects" within a scene as the human eye does. A number of techniques have been devised to extract 3D information from 2D images and review of these techniques can be found in "Converting 2D to 3D: A survey" research report XP-002469656 TU Delft by Qingqing Wei, December 2005. The analysis of motion and perspective provides the most promising techniques for analyzing video images which has led to the development of "structure-from-motion" techniques that are best summarized in reference "Multiple View Geometry in computer vision" by Richard Hartley and Andrew Zisserman, Cambridge University Press, 2000.

One of the methods of dealing with the ill-posed nature of 2D to 3D conversion is to attempt to combine depth information from multiple different analysis techniques. These depth fusion techniques for example may seek to combine depth-from-focus with motion segmentation. There is some prior art in this area, in particular "Learning Depth from single monocular images", A. Saxena et al, 2005, MIT Press, describes a method of using a probabilistic model to combine depth information from neighboring patches. Another approach is described in "Depth-Map Generation by Image Classification" by S. Battiato et al, Proceedings of SPIE, Vol. 5302, 95, 2004. This approach uses the classification of the image (e.g. indoor/outdoor) to determine which source of depth information to select. Finally, a method of prioritizing depth fusion by weighting motion results with methods such as depth from geometry is described in "Priority depth fusion for the 2D to 3D conversion system", Yun-Lin Chang, et al, Proc. SPIE, Vol. 6805, 680513, 2008.

This prior art suffers from several problems. For example, the method of combining multiple source of depth does not provide a consistent depth range. In general most, if not all, 2D to 3D conversion processes do not result in a good stereoscopic effect. The present invention seeks to provide an improved or enhanced depth map which is particularly suitable for use in the entertainment industry, although other industries and applications may also benefit.

SUMMARY

In a broad form there is provided a method to enhance or improve the quality of a depth map through the analysis of objects within an image.

In a further aspect there is provided a system for enhancing a depth map associated with a 2D image wherein:
 a face detector analyses the 2D image to determine a position of a face in the 2D image,
  the system utilizes the position to derive a depth model; and
  the depth model is combined with the depth map to generate an enhanced depth map.

The 2D image may be from a still or 2D photograph. Alternatively the 2D image may be from a frame of a video sequence. The system can be used over multiple frames of the video sequence to thereby provide for a stereoscopic video sequence.

In another aspect the present invention provides a method of creating an enhanced depth map including the steps of:
 receiving a 2D image and associated depth map;
 using a face detector to determine a position of a face in the 2D image;
 deriving a depth model based on the position; and
 combining the depth model with the depth map to create the enhanced depth map.

In still a further aspect the present invention provides a method of creating an enhanced depth map including the steps of:
 receiving a 2D image;
 generating an original depth map associated with the 2D image;
 using a face detector to determine a position of a face in the 2D image;
 deriving a depth model based on the position; and
 combining the depth model with the original depth map to create the enhanced depth map.

In the preferred arrangement the system also determines the likelihood of a third person in the 2D image based on the position of the face relative to the 2D image.

In the preferred arrangement the system sub-samples the 2D image prior to using the face detector so as to decrease the computational requirements. The face detector preferred to be used combines both image based and geometric methods to locate the position of a face in the 2D image.

The depth model can be derived by determining the depth of objects in the image and also the geometry of the objects. In this case the face of a person.

BRIEF DESCRIPTION OF THE DRAWINGS

An illustrative embodiment of the present invention will now be described with reference to the accompanying figures. Further features and advantages of the invention will also become apparent from the accompanying description.

FIG. 4a shows an example face detection and FIG. 4b shows a depth model calculated from the bounding box of FIG. 4a.

FIG. 5a shows an example over the shoulder (OTS) shot with face detection on the right side of the image, and FIG. 5b a depth model generated from the image of FIG. 5a.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The current invention describes a method of targeting faces as meaningful objects. This information is used as a basis for further analyzing of an image and enhancing the associated depth map, therefore leading to improved real-time 2D to 3D conversion. The overall system of the preferred embodiment provides a method of processing a sequence of one or more 2D images and their associated depth maps. While the present invention is focused on a sequence of frames such as in motion pictures, it will be understood that the present invention could also be used on still images. References to a single frame or frames are made in the context of explaining the present invention. It will be understood that a still image, or singe 2D frame, could be used. Equally it will be understood that the present invention can be used over multiple frames of a video sequence so as to produce for example a 3D motion picture.

Figure 1:
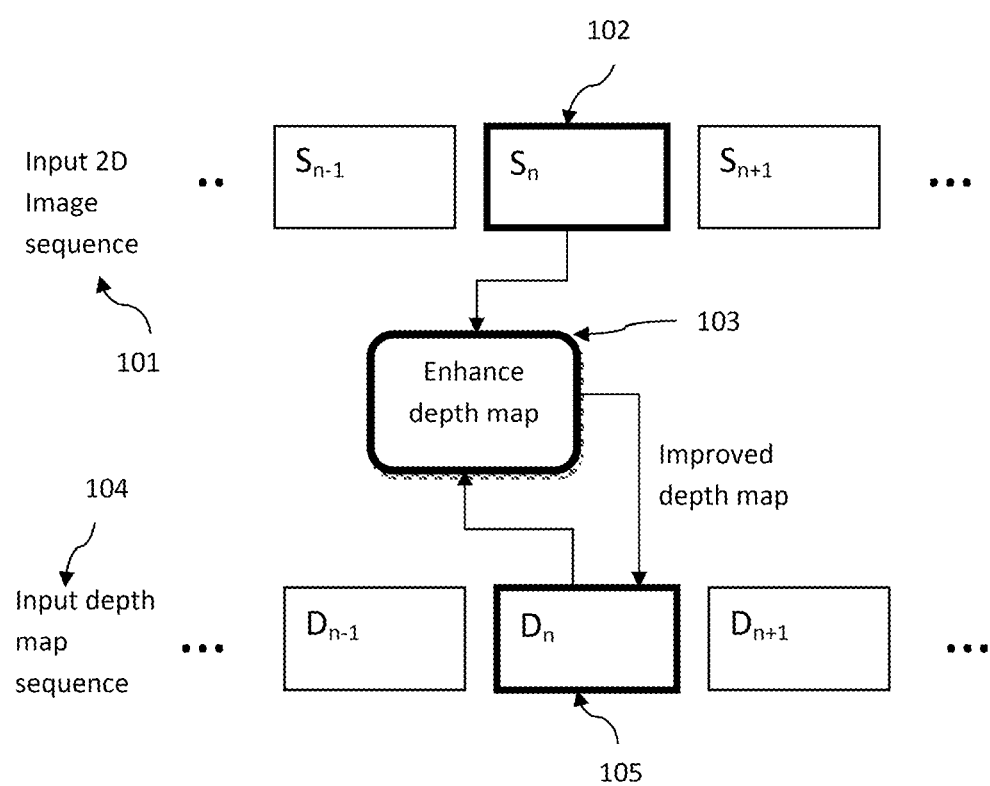
FIG. 1 shows an overall processing flow of one embodiment of the present invention.

FIG. 1 shows the overall processing sequence wherein depth maps are enhanced by analyzing frames of a 2D image sequence and improving the depth map Dn associated with the 2D image frame Sn. That is each source frame 102 is analyzed and used to enhance the associated depth map 105. The existing depth map can be generated by some other 2D to 3D conversion or acquisition system. In the alternative the system may firstly use existing techniques to generate a depth map from a 2D image prior to employing the present invention. In this way the present invention can still be employed when a depth map is not readily available.

The present invention can be implemented via a processor connected to a memory. The processor can receive a 2D image 102 via an input/output device or other communications means. This may for example be via a wireless device. The 2D image 102 may be stored in the memory. Ideally a depth map associated with the 2D image will also be provided.

The processor will analyze the 2D image to develop a depth model of the 2D image. This can also include using face detection techniques to locate a face in the image, and to then assess the likelihood of a third person being in the 2D image.

The processor will combine the depth model with the original depth map to create an enhanced depth map. The enhanced depth map can also be stored in the memory. Depending on the embodiment stereoscopic images may be created at the processor; alternatively the enhanced depth map can be transmitted together with the 2D image to an external device for creation and display of stereoscopic images.

The enhanced depth map can be transmitted or transferred via the input/output device to a display. At the display stereoscopic images can be generated from the original 2D images and enhanced depth map.

The present invention can also be implemented within the architecture of a modern stereoscopic 3D television set through the addition of an application specific integrated circuit (ASIC) to handle the inventive steps. The ASIC would connect to the video decoder or TV tuner on the input side and to the 3D rendering module on the output side.

A sequence of uncompressed images would be transmitted from the video decoder at regular intervals (depending on the video frame rate) to the input ports of the ASIC chip. The ASIC includes both the logic elements and internal memory required to process the 2D and depth inputs and generate the resulting enhanced depth map. Alternatively, the ASIC may use an external, shared memory to store temporary results such as sub-sampled image (201).

Alternatively, a System-on-Chip (SoC) or a field programmable gate array (FPGA) may be used instead of an ASIC chip, depending on performance and other commercial considerations, such as volume.

Similarly, the invention may be deployed on other multimedia entertainment platforms such as a personal computer (PC), mobile device (phone, tablet) or set top box (STB). Within the frame work of an SoC, modern PC or mobile device the invention may be implemented using a combination of general purpose processors (x86 or ARM) or the programmable graphics subsystems of typical Graphic Processing Units (GPU).

The current invention is used to improve the existing depth map based on semantic information discovered in the 2D image. It is also understood that following the enhancement 103 of the depth map additional enhancements may be applied to the depth map and or 2D image before rendering a stereoscopic image.

Figure 2:
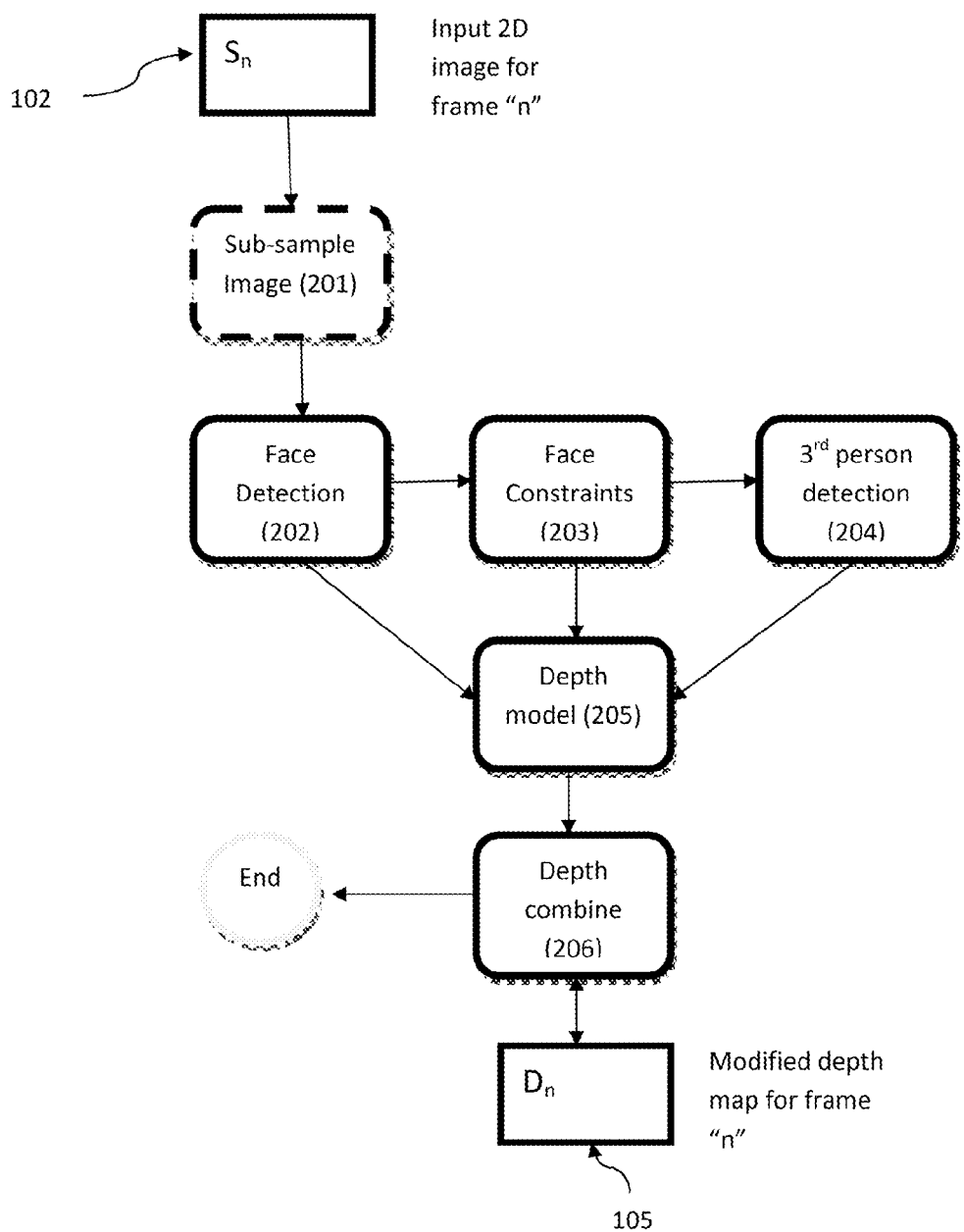
FIG. 2 shows a processing flow for the enhancement process of the embodiment of FIG. 1.

The enhancement process itself is illustrated in more detail in FIG. 2, which generally shows a processing flow showing stages involved in analyzing the 2D image at frame "n" and enhancing the corresponding depth map by generating a face model and combining it with the existing depth map. The first step is, to receive an input 2D image 102 for a given frame "n". In the preferred arrangement the 2D image is sub-sampled 201 ideally using a standard algorithm such as bilinear interpolation. Face detection can be computationally expensive and depends on the number of pixels in the image. By reducing the number of pixels that need to be analyzed the speed with which faces can be detected can be increased. Additionally, the sub-sampling process effectively smooths the image when a bilinear interpolation is used and this may increase the accuracy of the face detector by removing noise in the image. The degree of sub-sampling may vary depending on the resolution of the content and the performance of the system. Ideally the image is sub-sampled to a quarter resolution of the original input image for the purposes of depth analysis. However, this step is primarily used to increase performance and may be omitted in some embodiments.

The 2D image 102, or sub sampled image 201 in the preferred arrangement, is then examined to detect a face 202. Face detection per se is known to those in the industry. A face detector that is able identify one or more faces in a single 2D image and generate a bounding-box with an associated certainty score can be used with the current invention. The aim of the face detector should be to maximize the detection rate whilst minimizing the rate of false positive identification. Typical face detection algorithms rely on either image based methods or geometric methods, or some combination of the two. Image based methods rely on a set of examples of known faces and analyze subsets of the current image to detect similarities with the training set. Geometric methods are more directly targeted at detecting specific geometric features of a typical face, such as the distance between the eyes.

The preferred face detector used in this invention should be one that effectively uses a combination of image based and geometric methods. It consists of two stages: the training stage and the detection stage. During the detection stage successive subsets of the original 2D image are compared to results obtained from training sets. The comparison process uses Haar-like features within scaled subsets of the image. Haar-like features are essentially patterns of neighboring pixels that have been found to be effective at pattern recognition tasks. The score for a particular subset of the image is based on the differences between the average pixel intensities of each Haar-like feature.

In addition to the Haar-like features an additional feature based on color is used. The purpose of this feature type is to eliminate face candidates where the colors are unlikely to belong to a face. During the training phase a color lookup table is created to represent the likelihood of each color belonging to a face. A single histogram is created for the all of the colors of all of the faces in the training set. Although in theory a face could exhibit any color under the right lighting conditions the purpose of the color feature is to help trim out any areas unlikely to be a face as quickly as possible. The color feature is treated as a single summed rectangle of the mapped color values and acceptance or rejection of the candidate is based upon its resultant sum of color values equaling or exceeding the cut-off threshold.

During the training stage a standard AdaBoost algorithm can be used with two training sets: one containing faces and one that does not contain faces. The AdaBoost algorithm is used to determine which combination of features are most effective at discriminating between the two training sets. The AdaBoost algorithm assigns a weight to each feature during this training stage, which represents the effectiveness of a particular feature in accurately detecting faces.

In the detection stage, the weights calculated for each feature during the training stage are combined with the scores generated from current subset to produce a certainty score for the current subset. Using empirical methods the resulting score is normalized between 0 and 1 to indicate the likelihood that the current image subset includes a face. This certainty score is subsequently used during the construction of the depth model.

Depth Model

Figure 4A:
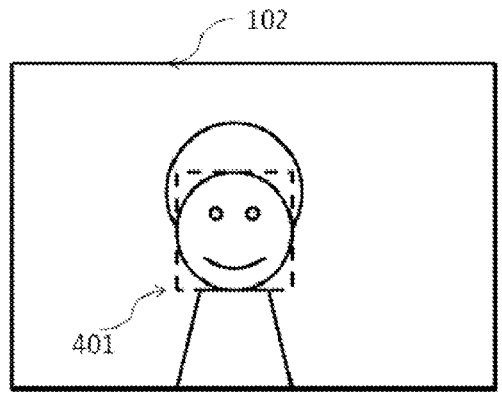
Figure 4B:
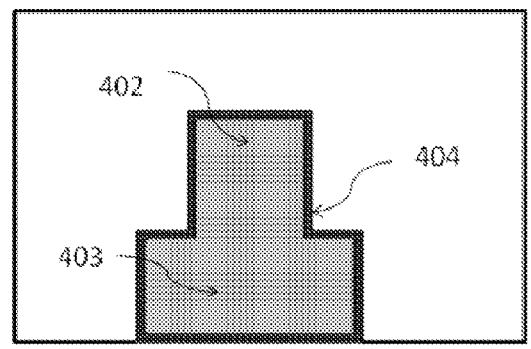

FIGS. 4a and 4b shows an image 102 containing a face. Using the technique described above a bounding box 401 (shown as a dashed outline) of the face is detected. This is used to form a depth model (205). The depth model shown in FIG. 4b indicates the distance of each pixel in the image from the camera or observer. For convenience dark colors represent pixels occurring closer to the screen and white colors being further away. To derive a depth model from the detected face the system determines two characteristics: the depth of the objects in the model and the geometry of the objects. The depth may be determined using the following formulae:

$$Depth = certaintyScore * (0.5 + 0.5 * SizeAsAProportionOfImageSize).$$

That is to say, the distance of the face from the camera is proportional to the size of the bounding box 401 around the face, combined with the certainty that the face is detected. The certaintyScore varies between 0 and 1, with 0 representing a complete lack of certainty and 1 representing complete confidence. The size of the bounding box is taken as a proportion of the image size. For example, if the width of the bounding box is 10 and the size of the image frame within which the face is detected is 100 then SizeAsAProportionOfImageSize is equal to 10/100=10%. Where faces overlap the maximum depth at each point is taken.

In the preferred embodiment, for each face detected in the image frame, the geometry of the model is constructed from two separate rectangles. The position of these rectangles is placed relative to the detected bounding box of the faces. The first rectangle defines the head and the second rectangle the body. This is shown diagrammatically in FIG. 4b where rectangle 402 represents the head of FIG. 4a and rectangle 403 represents the body. The position of these rectangles is calculated based on X0, Y0, the image coordinates of the detected face bounding box. The position of the head matches the position and size of the bounding box. The inferred body rectangle 403 is twice the width and half the height of the head rectangle and is positioned symmetrically below the face. The model can be cropped by the edges of the image boundary.

In both cases, the two rectangles for the depth model ideally include a "feathering" region 404 around the edge of the model to smoothly integrate the object into the depth model. In the preferred embodiment, a 4 pixel gradient is used to feather the rectangles from the depth of the rectangle to the background.

Figure 6A:
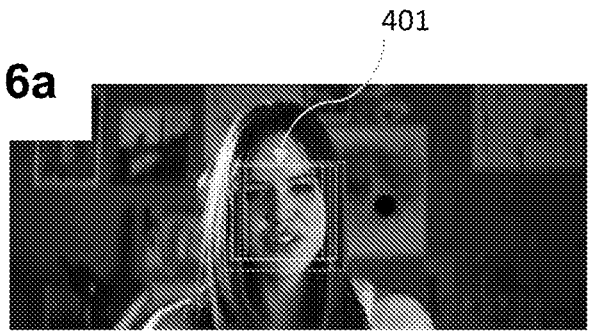
FIGS. 6(a)-6(d) exemplify the outputs of the present invention and improvements available.
Figure 6B:
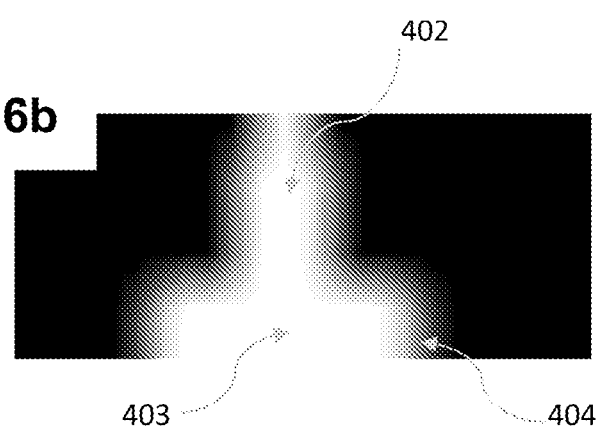
Figure 6C:
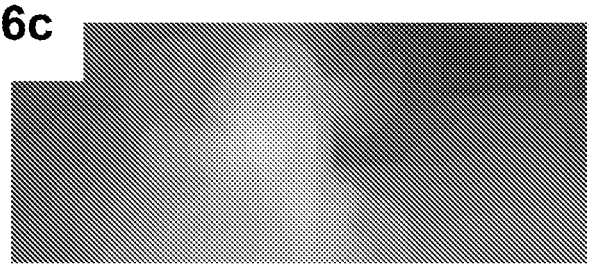

This process is illustrated in FIGS. 6a-6d which shows an applied example of the face detection (FIG. 6a) and depth model (FIG. 6b) processes. FIG. 6c illustrates a depth map generated from a 2D to 3D conversion process that does not include the present invention. The shades of grey represent the relative distance of each pixel in the 2D image from the observer's viewpoint, with white colors representing near distances and black colors representing far objects. It is clear from FIG. 6c that the depth map contains several errors—in particular that large parts of the wall are at the same distance from the camera as the person in the foreground. Once the depth model has been applied the depth map is significantly improved in terms of separation between foreground and background objects, leading to a much improved stereoscopic effect. While FIGS. 6a-6d provide exemplary depth maps and depth models, it will be understood that precise representations of such depth maps and depth models may vary from those shown in FIGS. 6a-6d. FIGS. 6a-6d are provided by way of example only so as to better illustrate the present invention as described further below.

Targeted Object Detection

Figure 5A:
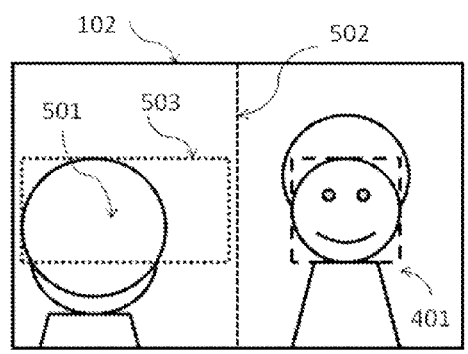
Figure 5B:
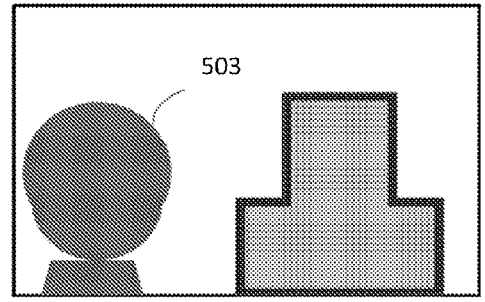

An aspect of the current invention is the ability to use the identification of one object to infer and target the detection of additional objects. Specifically, if a face is detected with certain constraints on the size and position, the system can hypothesize and test for the occurrence of other related objects, which often co-occur in the content In practice, it is common for movie directors to frame shots in a particular configuration. One particular configuration is the $3^{rd}$ person or "over-the-shoulder" (OTS) shot. Such shots are characterized by the camera filming behind or over the shoulder of a third person, such that the third person has their back to the camera and their face is not visible. This typical scene configuration is illustrated in FIGS. 5a and 5b, where 501 illustrates the back of the head of the $3^{rd}$ person. Given that the $3^{rd}$ person is not facing the camera it is not possible to use face detection to detect this object. However, if a face is detected 202 in the scene the system can use the position of the detected face to narrow down the search for the $3^{rd}$ person 204.

The first stage is to determine whether the scene is likely to be an OTS shot on the basis of the detected face. In the preferred embodiment two criteria are used within the face constraints process (203).

1. The bounding box of the largest detected face 401 is $\frac{1}{8}^{th}$ of the width of the image frame 102.
2. The bounding box of this face 401, is either side of the image center by $\frac{1}{20}^{th}$ of the width of image frame 102

It should be noted that these specific rules may vary depending on the type of content and that other values may be used without affecting the nature of the invention. For example, a certain director or film making style may favor close up over-the-shoulder shots. In this scenario, the constraints on the bounding box of the largest detected face 401 may be increased to $\frac{1}{5}^{th}$ of the width of the image frame.

Figure 3:
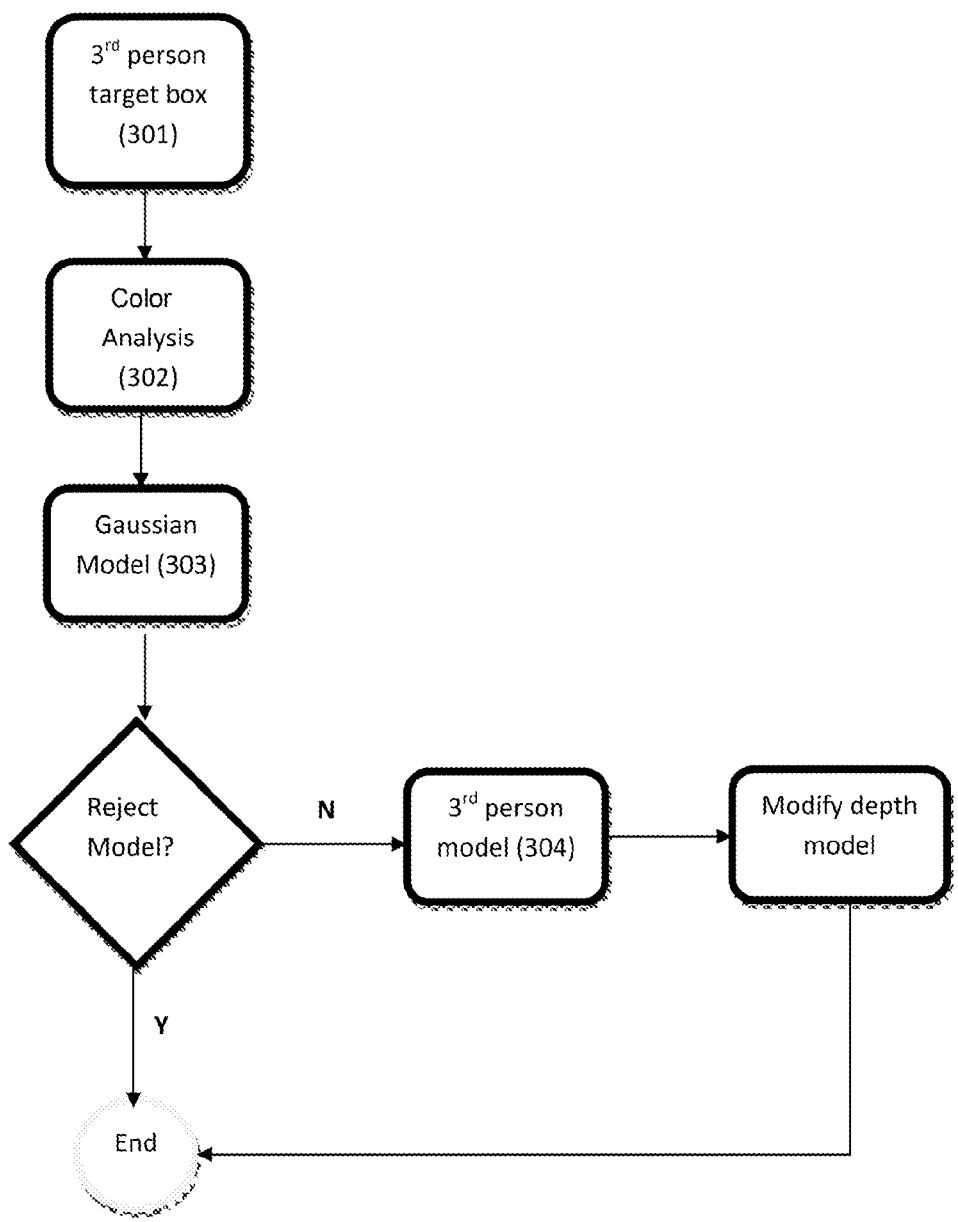
FIG. 3 shows a processing flow in relation to object detection.

If these conditions are met then the scene is identified as a possible OTS shot and the $3^{rd}$ person detecting process shown in FIG. 3 is initiated.

3rd Person Detection

A model of the $3^{rd}$ person can be established using a Gaussian mixture model, which is known to those skilled in the art as a method of clustering data. The Gaussian mixture model is characterized by an initial model approximation that is iteratively updated based on the actually data found in the image. The initial model is configured based on the position and color of the object. To trigger the OTS detector recall that it is necessary to detect a face on one side of the image. The spatial extent of the $3^{rd}$ person is therefore configured to be on the "other" side of the image. For example, if a face, matching the suitable criteria is detected on the right side of the center line 502 then the $3^{rd}$ person is going to be found on the left side of the image frame 102. The initial spatial extent 301 of the $3^{rd}$ person is set to match the X coordinates of the detected face bounding box 401. The X coordinate is set to extend from the center line 502 to the edge of the image frame 102. This is illustrated by the dotted line rectangle 503 in FIG. 5a. The initial color distribution of the model can be determined from the mean color of the bounding box 401.

To determine the color 302 of the initial model the most frequently occurring color in the target region 503 is used. In the preferred embodiment a histogram is formed of the colors and the most frequently occurring color is chosen for the initial model.

Using standard Gaussian mixture model techniques 303 the model is iterated until convergence is reached. The model is rejected if after convergence the modified model's spatial extents touch or overlap the detected face bounding box 401. Effectively this indicates that the object at the side of the screen extends beyond the center line and is therefore not likely to represent a discrete $3^{rd}$ person at the edge of the screen but is actually part of the background. The model may also be rejected if the variability in color of the 2D image is too large in the target area. This criterion is based on the observation that the image data in the area of the $3^{rd}$ person is generally dominated by one or two colors. It is assumed that in a valid $3^{rd}$ person scene around 60-90% of the target area is dominated by one or two colors. If the color variability in the $3^{rd}$ person target area is too large then the Gaussian model will include a larger color variance. This will increase the extent of the converged model and it will subsequently be rejected based on its spatial extent, as described above.

The method of developing a depth model 304 for the $3^{rd}$ person differs from the approach described above for a detected face. In the preferred embodiment the $3^{rd}$ person is modeled on the basis of the color of the Gaussian mixture model. For each pixel in the spatial extents of the converged Gaussian mixture model the depth is determined as function of the image pixel color relative to the model. If the image pixel color matches the mean value of the Gaussian mixture model color then the depth model is assigned as foreground (255). The drop-off is defined linearly so that a color that differs by 10% of the total color range drops off to a background value (0).

It should be noted that the example given above is just one possible configuration and that the same basic invention can be used to model scenes with different configurations. For example, if the scene was shot over the shoulder of two people on either side of the frame then it would be trivial to detect this arrangement and include an additional detection and modeling step for the second person's shoulder.

Depth Combine

The depth model derived from the analysis of the 2D source images 102 is used to modify the pre-existing depth map 105. This is achieved by the following formulae:

Modified Depth(x,y)=Clamp(Depth(x,y)+(Model(x,y)−ModelMean)).

Effectively, the depth of each pixel at location x,y is modified by applying a saturated zero-mean addition including the existing depth at x,y and the model depth at x,y. The ModelMean value represents the mean depth of the model. The Clamp function simply ensures that the modified depth value stays between 0 and 255. If the value exceeds 255 it is set to 255 and if the value is below 0 then it is set to 0. The advantage of this approach is that it ensures that the resultant depth map has sufficient depth contrast to produce high quality stereoscopic 3D images.

The present invention provides an enhanced depth map by analyzing an image sequence and targeting specific semantic objects and using the analysis to develop an enhanced depth model which is combined with the existing depth data to improve the quality of stereoscopic 3D rendering.

The enhancement can be seen in the example images shown in FIG. 6. FIG. 6a shows a 2D image with bounding boxes from a face detector superimposed. It can be seen that the face detector has identified the face of the subject in the image. Using a 2D to 3D conversion process the depth map as shown in FIG. 6b is determined. It can be seen that the process for generating the depth map has identified both the main subject in the image, and also other objects. For example the pictures on the rear wall have been identified. In this case the resultant stereoscopic images generated from the depth map of FIG. 6b would not be as life like as a viewer would subconsciously expect each of the pictures to be of a similar depth as the rear wall. The stereoscopic images could project the pictures as being located in front of the wall.

The present invention takes both the original image of FIG. 6a and the depth map of FIG. 6b as inputs, so as to create an enhanced depth map. As described previously the present invention uses a face detector and creates a depth model based on the location of the face. A depth model created from the image of FIG. 6a is shown in FIG. 6c. In FIG. 6c the position of the head and shoulders are prominent and the remained of the image is largely ignored. FIG. 6c also shows the feathering that is ideally included around the edges of the head and shoulders in the model.

Figure 6D:
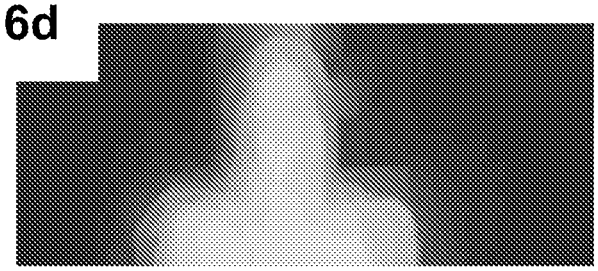

When the depth model is combined with the depth map as disclosed in the present invention an enhanced depth map as exemplified in FIG. 6d is generated. It can be seen that the enhanced depth map provides a closer representation of the ideal depth map. In this case the majority of the pictures on the rear wall would be properly located on the wall rather than in front of the wall in a stereoscopic image.

In practical terms, an enhanced depth map is one which creates a stereoscopic image which appears to be more realistic or lifelike to an observer. Whilst the improvement shown in FIG. 6 is easily appreciated, for some images this can be difficult to measure as different observers will have differing degrees of acuity when it comes to stereo vision.

In such cases the aim of the depth enhancement process could be to more closely resemble the real physical depth map that would have been generated had a depth map camera been used to capture the distances. 2D to 3D conversion processes may fail to fully identify human subjects as they consist of several components (hair, face, body) with different color and motion characteristics that may be difficult to connect to a single object using traditional image processing and image segmentation methods. The present invention explicitly targets the detection of faces, and once detected generates depth models of the associated bodies that must be attached to such faces. The depth model created is then combined with a depth map to compensate for the deficiencies of current depth maps as disclosed in the prior art.

FIG. 6 clearly illustrates the benefits of the present invention. If the system is able to detect a face and from the face deduce an attached body the present invention is able to improve the separation of the women shown in the foreground, from the wall in the background. In FIG. 6b, using traditional means to generate a depth map without face detection we are unable to distinguish aspects of the wall behind the women from her face/body. But with explicit face detection as disclosed herein the present invention provides a better depth contrast between the foreground and the background. This improved result, as shown in FIG. 6d, would be closer to the results from a depth map camera than that of traditional conversion processes.

The prior art in 2D to 3D conversion processes do not result in consistently accurate stereoscopic effects because they are unable to target and detect specific objects such as faces and construct depth models. This deficiency leads to inaccuracies in the depth maps and reduces the effectiveness of the stereoscopic 3D image.

The current invention includes a method of accumulating depth information from multiple sources that provides greater depth contrast and consistency for real-time 2D to 3D conversion techniques relative to the prior art. In addition, the prior art for real-time 2D to 3D conversion does not describe a method of identifying and reasoning with objects in the scene that are visually important to the observer.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment.

Furthermore, the particular features, processes, or characteristics may be combined in any suitable manner in one or more combinations. It will be appreciated that persons skilled in the art could implement the present invention in different ways to the one described above, and variations may be produced without departing from its spirit and scope.

Any discussion of documents, processes, acts or knowledge in this specification is included to explain the context of the invention. It should not be taken as an admission that any of the material forms part of the prior art base or the common general knowledge in the relevant art, in any country, on or before the filing date of the patent application to which the present specification pertains.

The invention claimed is:

1. A system for enhancing a depth map associated with a 2D image, the system comprising:
    a face detector arranged to analyze the 2D image to detect a presence of a face in the 2D image and determine a position of the detected face in the 2D image,
    wherein the system utilizes the position to derive a depth model;
    the depth model including at least one defined shape added to the depth model at a location corresponding to the determined position in response to detection of the face, the at least one defined shape representative of the detected face; and
    the at least one defined shape in the depth model including depth information indicative of depth of the face; and
    wherein the system combines the depth model with the depth map to generate an enhanced depth map by modifying depth information in the depth map at a location corresponding to the at least one defined shape in the depth model using the depth information associated with the at least one defined shape in the depth model.

2. The system as claimed in claim 1, wherein the 2D image is a frame of a video sequence.

3. The system as claimed in claim 1, wherein the face detector is configured to generate a bounding box and a certainty score indicative of a certainty that a face is correctly detected by the face detector.

4. The system as claimed in claim 3, wherein the depth of said the face is determined by combining the certainty score with a proportion of a size of the bounding box relative to the 2D image.

5. The system as claimed in claim 3, wherein a depth of the face is determined by:

Depth=certaintyScore*(0.5+0.5*SizeAsAProportionOfImageSize), wherein the SizeAsAProportionOfImageSize refers to a proportion of a size of the bounding box relative to the 2D image, and the certaintyScore is indicative of the certainty that a face is correctly detected by the face detector.

6. The system as claimed in claim 3, wherein the system determines a likelihood that a third person is present in the 2D image based on the position of the detected face relative to the 2D image.

7. The system as claimed in claim 6, wherein the likelihood that a third person is present in the 2D image is determined by calculating whether the bounding box is between $\frac{1}{8}$ and $\frac{1}{5}$ of a width of the 2D image, and the bounding box is located from a center line of the 2D image by about $\frac{1}{20}$ of a width an image frame of the 2D image.

8. The system as claimed in claim 6, wherein a model of the third person is validated utilizing a Gaussian mixture model with regard to a color and a position encompassing the third person.

9. The system as claimed in claim 8, wherein the model is rejected if spatial extents of the model overlap or touch the bounding box.

10. The system as claimed in claim 8, wherein the system defines a third person target area, and the model is rejected if the third person target area is not dominated by a single color.

11. The system as claimed in claim 8, wherein the system defines a third person target area, and wherein a depth of a pixel of the 2D image in the third person target area is determined by its similarity to the model.

12. The system as claimed in claim 1, wherein the at least one defined shape includes a first rectangle or square.

13. The system as claimed in claim 12, wherein the depth model further includes a second rectangle representing shoulders of a person, the second rectangle being twice a width and half a height of the first rectangle.

14. The system as claimed in claim 13, wherein the first and second rectangles include a feathering region at edges of the first and second rectangles, the feathering region for smoothly integrating an object into the depth model.

15. The system as claimed in claim 1, wherein combining of the depth model and the depth map is determined by:

$$\text{Improved Depth}(x,y) = \text{Clamp}(\text{Depth}(x,y) + (\text{Model}(x,y) - \text{ModelMean}))$$

wherein Clamp is a function that ensures a modified depth value stays between a defined range of values, Depth (x,y) is a depth of a pixel at location (x,y), Model (x,y) is a model depth at location (x,y), and ModelMean represents a mean depth of the depth model.

16. The system as claimed in claim 1, wherein the 2D image is sub-sampled and the face detector is configured to analyze the sub-sampled 2D image.

17. The system as claimed in claim 16, wherein the 2D image is sub-sampled to about a quarter resolution of the 2D image.

18. A method of creating an enhanced depth map, the method including the steps of:
receiving a 2D image and associated depth map;
using a face detector to detect a presence of a face in the 2D image and determine a position of the detected face in the 2D image;
deriving a depth model based on the position, the depth model including at least one defined shape added to the depth model at a location corresponding to the determined position in response to detection of the face, the at least one defined shape representative of the detected face, and the at least one defined shape in the depth model including depth information indicative of depth of the face; and
combining the depth model with the depth map to create the enhanced depth map by modifying depth information in the depth map at a location corresponding to the at least one defined shape in the depth model using the depth information associated with the at least one defined shape in the depth model.

19. The method as claimed in claim 18, wherein the 2D image is a frame of a video sequence.

20. The method as claimed in claim 18, comprising the steps of:
generating a bounding box around the detected face; and
calculating a certainty score indicating a certainty that a face is correctly detected by the face detector.

21. The method as claimed in claim 20, further including calculating a proportion of a size of the bounding box relative to the 2D image; and
combining the proportion with the certainty score to determine the depth of said the detected face.

22. The method as claimed in claim 21, wherein combining the proportion and the certainty score is achieved by:

$$\text{Depth} = \text{certaintyScore} * (0.5 + 0.5 * \text{SizeAsAProportionOfImageSize}),$$

wherein said the SizeAsAProportionOfImageSize refers to the proportion of the size of the bounding box relative to the 2D image, and the certaintyScore is indicative of the certainty that a face is correctly detected by the face detector.

23. The method as claimed in claim 20, further including the steps of:
locating a position of the bounding box;
calculating a width of the bounding box;
determining whether the bounding box is between ⅛ and ⅕ of a width of the 2D image; and
determining whether the bounding box is offset from a center line of the 2D image by about ¹⁄₂₀ of a width of an image frame of the 2D image.

24. The method as claimed in claim 23, further including the steps of determining a likelihood that a third person is present in the 2D image based on the position of the detected face relative to the 2D image and utilizing a Gaussian mixture model and a color model of a region encompassing the third person to establish a model of the third person.

25. The method as claimed in claim 24, further including the step of rejecting the model if spatial extents of the model overlap or touch the bounding box.

26. The method as claimed in claim 24, further including:
defining a third person target area;
analyzing pixel colors in the target area; and
rejecting the model if the third person target area is not dominated by a single color.

27. The method as claimed in claim 24, further including:
defining a third person target area;
comparing color of a pixel in the target area with the model; and
assigning depth to the pixel based on the similarity of the pixel to the model.

28. The method as claimed in claim 18, wherein the at least one defined shape includes a first rectangle or square.

29. The method as claimed in claim 28, further including the step of determining a second rectangle representing shoulders of a person, the second rectangle being twice a width and half a height of the first rectangle.

30. The method as claimed in claim 28, further including the step of adding a feathering region of about 4 pixels, the feathering region for smoothly integrating an object into the depth model.

31. The method as claimed in claim 18, wherein the combining of the depth model and the depth map is determined by:

$$\text{Improved Depth}(x,y) = \text{Clamp}(\text{Depth}(x,y) + (\text{Model}(x,y) - \text{ModelMean}))$$

wherein Clamp is a function that ensures a modified depth value stays between a defined range of values, Depth (x,y) is a depth of a pixel at location (x,y), Model (x,y) is a model depth at location (x,y), and ModelMean represents a mean depth of the depth model.

32. The method as claimed in claim 18, further including the step of sub-sampling the 2D image, wherein the face detector analyzes the sub-sampled 2D image.

33. The method as claimed in claim 32, wherein the 2D image is sub-sampled to about a quarter resolution of the 2D image.

34. A system for enhancing a depth map associated with a sequence of one or more 2D images comprising:
- an object detector arranged to analyze the 2D image to detect a presence of an object in the 2D image and determine a position of the detected object;
- wherein the system utilizes the position to derive a depth model;
- the depth model including at least one defined shape added to the depth model at a location corresponding to the determined position in response to detection of the object, the at least one defined shape representative of the detected object; and
- the at least one defined shape in the depth model including depth information indicative of the depth of the object; and
- wherein the depth model is combined with the depth map to generate an enhanced depth map by modifying depth information in the depth map at a location corresponding to the at least one defined shape in the depth model using the depth information associated witht the at least one defined shape in the depth model.

\* \* \* \* \*